(12) United States Patent
Tucker

(10) Patent No.: US 7,594,530 B1
(45) Date of Patent: Sep. 29, 2009

(54) ORBITAL FOAMED MATERIAL EXTRUDER

(75) Inventor: Dennis S. Tucker, Huntsville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 203 days.

(21) Appl. No.: 11/942,322

(22) Filed: Nov. 19, 2007

(51) Int. Cl.
*B22D 27/00* (2006.01)
(52) U.S. Cl. .......................... 164/79; 75/415
(58) Field of Classification Search ................ 164/79; 75/415, 680
See application file for complete search history.

(56) References Cited

U.S. PATENT DOCUMENTS

| | | | |
|---|---|---|---|
| 3,005,700 A | 10/1961 | Elliott | |
| 3,087,807 A | * 4/1963 | Allen et al. | .......... 75/415 |
| 3,647,924 A | 3/1972 | Raquin | |
| 3,941,182 A | 3/1976 | Bjorksten et al. | |
| 4,168,182 A | 9/1979 | Rossmann et al. | |
| 4,314,835 A | 2/1982 | Pelton | |
| 4,480,677 A | 11/1984 | Henson et al. | |
| 4,677,642 A | 6/1987 | Robinson et al. | |
| 4,973,358 A | 11/1990 | Jin et al. | |
| 6,263,953 B1 | 7/2001 | Emil | |
| 6,508,854 B2 | 1/2003 | Minagawa et al. | |
| 6,889,744 B2 | 5/2005 | Keetman et al. | |
| 6,930,304 B2 | 8/2005 | Schubert | |

\* cited by examiner

*Primary Examiner*—Kuang Lin
(74) *Attorney, Agent, or Firm*—James J. McGroary; Norton R. Townsley

(57) ABSTRACT

This invention is a process for producing foamed material in space comprising the steps of: rotating the material to simulate the force of gravity; heating the rotating material until it is molten; extruding the rotating, molten material; injecting gas into the extruded, rotating, molten material to produce molten foamed material; allowing the molten foamed material to cool to below melting temperature to produce the foamed material. The surface of the extruded foam may be heated to above melting temperature and allowed to cool to below melting temperature. The extruded foam may also be cut to predetermined length. The starting material may be metal or glass. Heating may be accomplished by electrical heating elements or by solar heating.

15 Claims, 2 Drawing Sheets

ORBITAL FOAMED MATERIAL EXTRUDER

GOVERNMENT EMPLOYEE INVENTION

The invention described herein was made by an employee of the United States Government and may be manufactured and used by or for the Government of the United States of America for governmental purposes without the payment of any royalties thereon or therefor.

BACKGROUND OF THE INVENTION (1) Field of the Invention

The present invention relates to the field of extrusion and more particularly to the field of extruded foam structural shapes.

(2) Description of the Related Art

A number of patents have to do with forming metal foams.

U.S. Pat. No. 3,005,700 discloses a process of producing foamed metal by melting a metal, continuously introducing it into a reaction chamber by gravity flow, continuously introducing a solid state thermally decomposable foaming agent into the reaction chamber and intermixing the metal and foaming agent in the reaction chamber. The foaming agent is decomposed by the heat of the metal to cause foaming of the metal. The foamed metal is expelled from the reaction chamber by expansive force of metal foaming in the chamber. Then the transferred metal then is allowed to cool to provide solidified foam metal product.

U.S. Pat. No. 3,647,924 discloses an electrically powered furnace for melting high-melting point materials in the vacuum and zero gravity environment of space comprising an alumina crucible, cylindrical in shape, and enclosing a cylindrical tantalum sample holder that contains the sample to be melted. The crucible is surrounded by concentric cylindrical enclosures made of polished sheet molybdenum. The sample holder is clamped between a pair of round plates and a pair of alignment bolts are joined to the circular plates and extend along the longitudinal axis of the furnace through the end covers of the crucible and surrounding concentric enclosures.

U.S. Pat. No. 3,941,182 discloses steel wires are pulled through a reactor tube in which they continuously interact with a foaming metal mass. The steel wires are coated with a metal which forms a binary alloy with the matrix metal, thereby protecting the steel from being dissolved. The foaming matrix metal is usually aluminum alloy but can be any light or low melting metal including zinc or lead. The steel wires protect the metal foam from cracking in the pultrusion process.

U.S. Pat. No. 4,677,642 discloses an electron bombardment furnace (B) which consists of two confinement grid sections (26, 28) which may be moved and separated from each other. Inside the bombardment furnace, a tungsten element (14) is enclosed. The material specimen (18) is located within the tungsten element and grounded by means of grounded support wires (20, 22) connected to the respective sections of the furnace. The material specimen (18) is supported on the ground wires and heated by electron bombardment until melt occurs. The furnace sections are separated in opposite directions causing the ground wires to pull from the surfaces of the specimen, leaving the specimen freely suspended in the process chamber without the action of external forces. The specimen remains in its melt condition in the processing chamber where it can be undercooled without external forces acting on the specimen, which would cause dynamic nucleation.

U.S. Pat. No. 4,168,182 discloses a shaped metal base component being formed, such as by casting or forging. The component is then thinly coated with a material, such as a ceramic material, having a higher melting point than the material of the shaped component. The coated component is then heated under zero gravity conditions up to a temperature which is below the melting point of the coating, but which is high enough to soften the component, the coating maintaining the shape of the component during the heating step. After completion of the heating step, the coated component is cooled under zero gravity conditions. The forming and coating of the component take place on earth, and the steps of heating and cooling the coated component are performed in space. After cooling the coated component, the coating is either stripped off the component or left on the component to form an integral part of the shaped body.

U.S. Pat. No. 4,314,835 discloses an improved article made of foamed glass or similar materials and method of manufacture. Thus, a construction panel may be formed to bear weight, withstand weather and take reasonable impact and abuse, because of a tempered outer skin supported inside by a skeletal network of solid, poreless material formed about low density pockets of substantially constant size and frequency. These panels are made by continuous pulling of the panels through a heat controlled mold in contact with the surface skin from a continuously fed molten mass into which is injected from the bottom size and frequency controlled foaming agents or gaseous bubbles which rise in the molten mass to a position where they are frozen in place.

U.S. Pat. No. 4,480,677 discloses an apparatus and methods whereby materials may be processed and formed in space utilizing the special conditions of space to great advantage. More specifically, methods and apparatus are presented which vaporize substances on a variety of forms. The processing steps required are: a. heat a material (not necessarily a metal) to form a vapor; b. direct the vapor, and c. deposit the material on a form. To provide the energy required for this process, sunlight is concentrated by a mirror, directed through an aperture, converted to heat by absorption, and the heat conducted to a cavity where metals such as steel or aluminum, are vaporized. The metal is fed into the cavity in the form of a rod. The resultant metal vapors are expanded through a nozzle and directed to a temperature controlled inflated form which may be rotated in the path of the metal vapor beam. This fabrication method seems particularly well suited for forming seamless pressure vessels on inflated forms, or flat surfaces on endless belts, but is not limited to such shapes and forms. Objects with complex internal structure may be formed provided the surfaces are locally flat or have smooth curves. The metallurgy of vapor deposited metals in particular is well understood and a large number of patents (see for example Cole, U.S. Pat. No. 3,690,333) have been obtained in this field for the use of vapor deposition for coating substrates.

U.S. Pat. No. 4,973,358 discloses a method for producing foamed metal in which gaseous bubbles are retained within a mass of molten metal during foaming. The method comprises heating a composite of a metal matrix and finely divided solid stabilizer particles above the liquidus temperature of the metal matrix, discharging gas bubbles into the molten metal composite below the surface thereof to thereby form a foamed melt on the surface of the molten metal composite and cooling the foamed melt thus formed below the solidus temperature of the melt to form a solid foamed metal having a plurality of closed cells.

U.S. Pat. No. 6,263,953 discloses a continuous casting method comprising the following steps: a) the material is melted and a continuous strand formed from said material; b)

the material strand is cooled or left to cool so that at least a part thereof has a temperature at which its structure is pasty; c) gas is introduced into that part of the material strand which has a pasty structure so as to form hollow cavities, the material strand being moved from the top towards the bottom; and d) the material is left to solidify. The invention also relates to a device for carrying out this method.

U.S. Pat. No. 6,508,854 discloses a method of preparing a magnetostrictive material, including the steps of: (a) forming a melt of metals having a composition corresponding to the magnetostrictive material; (b) subjecting the melt to a microgravity environment; and (c) cooling the melt in the microgravity environment at a rate of at least 50° C. per second, while applying a magnetic field to the melt, to solidity the melt.

U.S. Pat. No. 6,889,744 discloses an apparatus and a method for foaming a hollow profile with metal foam. The device comprises induction means, into which the hollow profile can be introduced, in which a foamable raw material is disposed, the hollow profile having an electrical interruption, which extends in its longitudinal direction of the hollow profile, and being in contact with the induction means at least at one place, so that, during the inductive foaming of the raw material, the (56) References Cited hollow profile forms part of the induction means.

U.S. Pat. No. 6,930,304 discloses a process and apparatus for separating element isotopes in a microgravity or low-gravity environment using electromagnetic radiation, e.g., sunlight, to heat and ionize a stream of raw materials, followed by electromagnetic separation, and collection of the desired isotopes in or on one or more collection surfaces or receptacles, such as a rotating surface. A cylindrical mirror can serve to collect and concentrate the electromagnetic radiation, permitting the stream of material to be heated and ionized while the path of the stream of material is oriented other than parallel to the direction of the radiation.

None of the above listed patents describe an orbital foam extrusion apparatus or process that rotates to produce 1 g conditions. Development of an orbital foam extrusion apparatus and process which can rotate to produce 1 g conditions represents a great improvement in the field of space construction and satisfies a long felt need of the space construction engineer.

SUMMARY OF THE INVENTION

To build large structures in orbit, takes a large amount and mass of material. Foaming will permit uploading of less material.

This invention is a process for producing foamed material in space comprising the steps of: rotating the material to simulate the force of gravity; heating the rotating material until it is molten; extruding the rotating, molten material; injecting gas into the extruded, rotating, molten material to produce molten foamed material; allowing the molten foamed material to cool to below melting temperature to produce the foamed material.

The surface of the extruded foam may be heated to above melting temperature and allowed to cool to below melting temperature. The extruded foam may also be cut to predetermined length. The starting material may be metal or glass. Heating may be accomplished by electrical heating elements or by solar heating.

The apparatus for producing this foamed material comprises: a furnace which rotates to simulate the force of gravity and heats the starting material until it is molten; an extrusion die adjacent the outlet; and a ram at the rear of the furnace for extruding the molten material through the extrusion die. The outlet of the furnace is located on the front of the furnace at its center of rotation. The extrusion die includes a gas injector for injecting gas into the molten material. There may in addition be one or more pull rollers adjacent the extrusion die. There may also be a cutter at a distance from the furnace.

The furnace may be heated electrically using spacecraft power or by solar radiation. If solar radiation is used, radiation is concentrated preferably by a Fresnel lens. Starting material may be loaded into the furnace via a door or by means of an induction motor.

The key features of this invention are use of a Fresnel lens for focusing the sun's rays, and rotating the assembly to simulate 1 g conditions so that gas injection can be used. Gas injection achieves bubble buoyancy. This is an autonomous system that can be used in low earth orbit (LEO), geosynchronous earth orbit (GEO), lunar orbit, Martian orbit, etc.

One objective of this facility is to produce foamed metal and glass structural elements in orbit, either low earth or geosynchronous, to be used for construction of habitats and telescopes. Unique features: induction motors for putting metal into furnace, Fresnel lens for heating via sunlight, induction heater for remelting the surface of a metal element.

An appreciation of the other aims and objectives of the present invention and an understanding of it may be achieved by referring to the accompanying drawings and description of a preferred embodiment.

DETAILED DESCRIPTION OF THE PREFERRED EMBODIMENT

Figure 1:
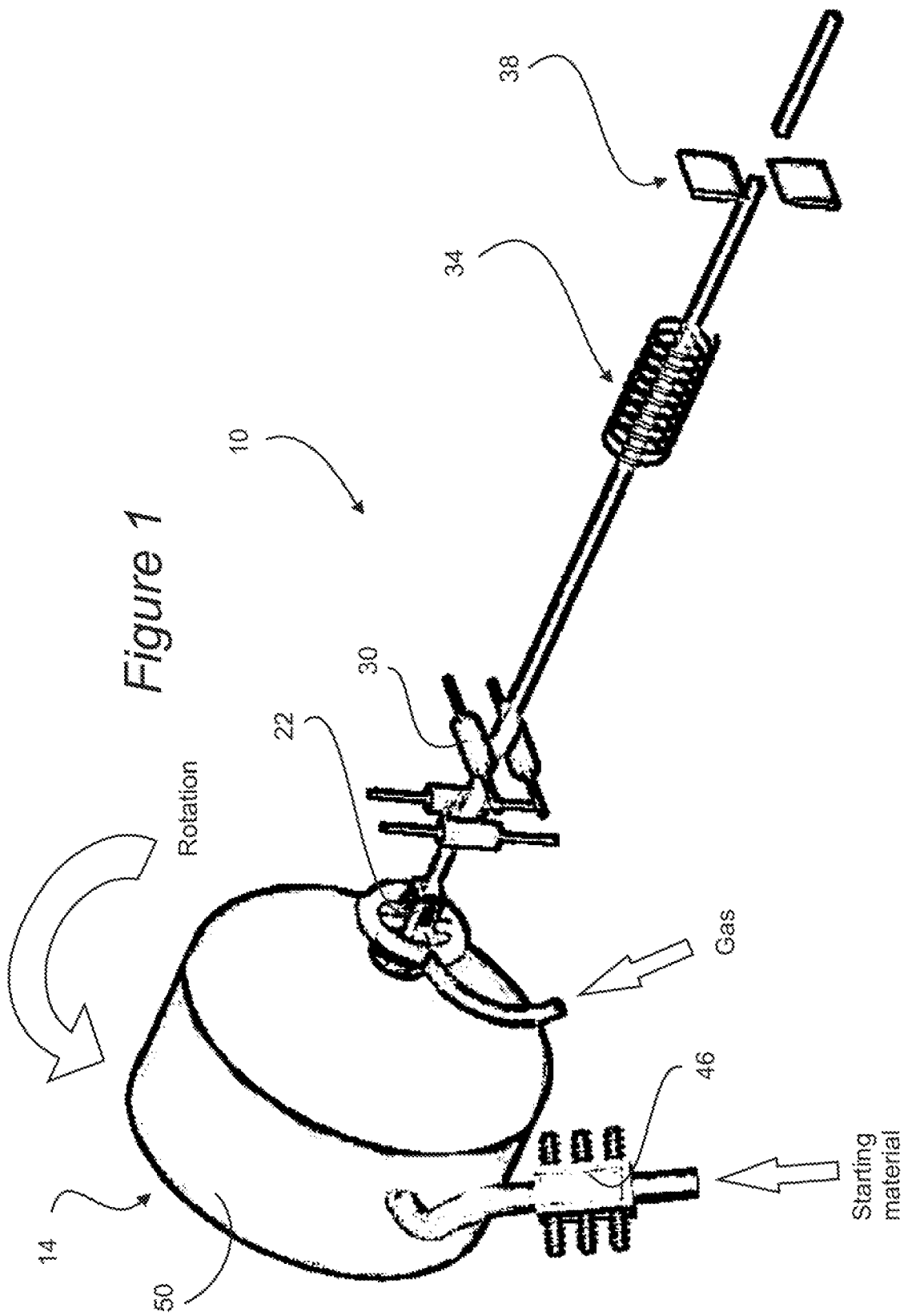
FIG. 1 is a perspective view of the apparatus for carrying out the process of this invention.
Figure 2:
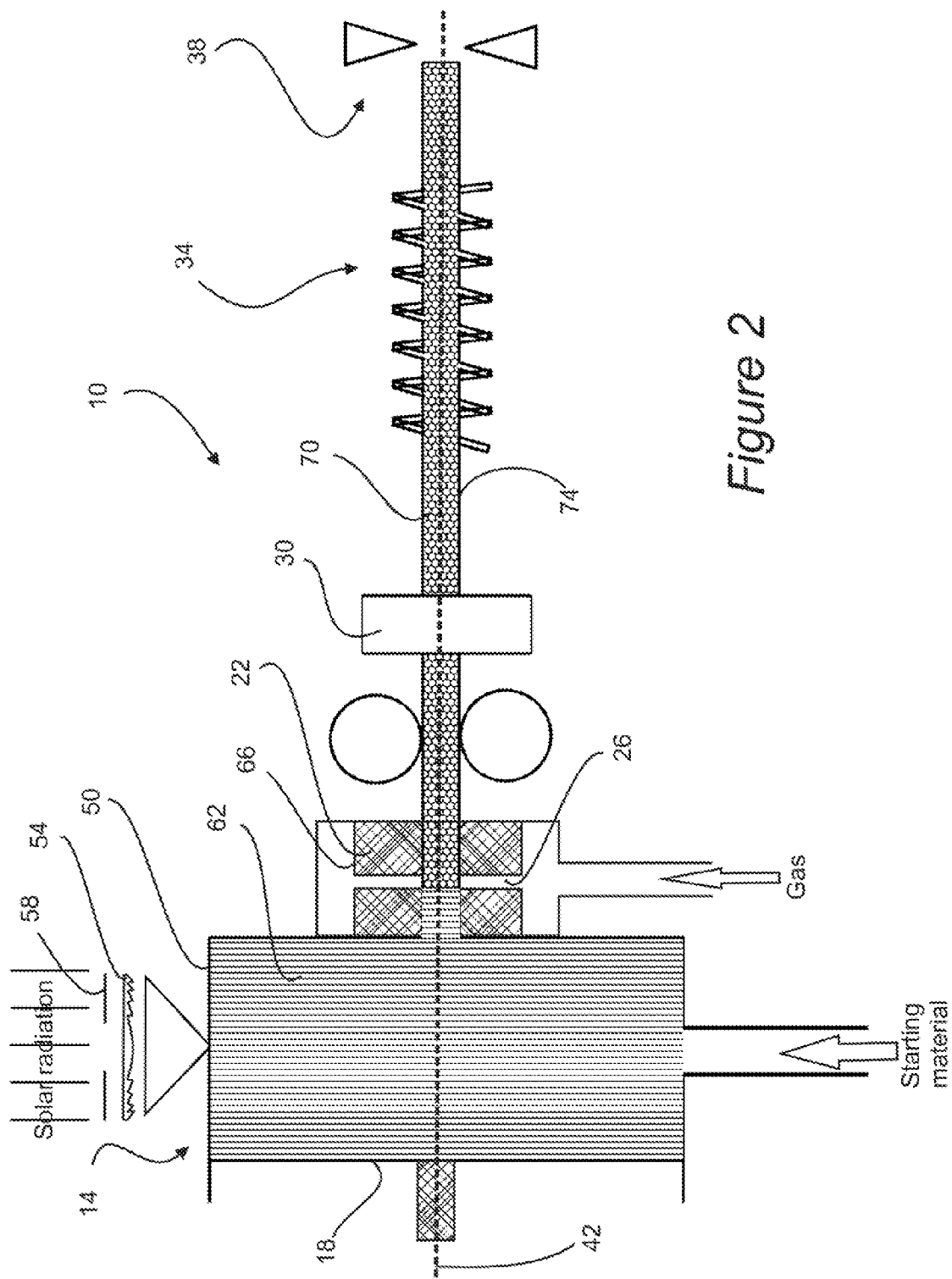
FIG. 2 is a longitudinal cross sectional view of the apparatus for carrying out the process of this invention

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Referring to the Figures, the apparatus 10 for carrying out the process of this invention comprises a cylindrical furnace 14 with a ram 18 at its rear and an extrusion die 22 at its front in the center. The ram 22 can be either hydraulic or screw driven. The extrusion die 22 includes through channels 26 connected to a gas supply. At a distance from the extrusion die is at least one pair and preferably two pairs of pull rollers 30. At a distance from the pull rollers 30 is an induction heating coil 34. At a distance from the heating coil is a cutter 38. In space the apparatus will be rotated about its long axis 42 to simulate the force of gravity by known methods. Rotation is necessary to provide buoyancy for the gas that will be introduced to produce the foam 70.

Preferably metal is fed by induction motors 46 into the furnace 14. Alternatively, glass can be fed by a door (not illustrated). The furnace 14 may be heated electrically by known methods or by use of solar radiation. If solar radiation is used it will be concentrated via a lens and the outside 50 of the furnace 14 will have a matte black finish to absorb sunlight efficiently. A Fresnel lens 54 is preferred. Temperature is controlled by using an iris 58 on the lens.

Once the material 62 is molten it is pushed through the die 22 by the ram 18. The die 22, which can have a circular, square, rectangular or any other required shape cross section, has gas injectors 26 around its perimeter 66 to inject gas into the melted material 62 which produces a foam extrusion 70. Under the force of rotation the gas permeates the molten material 62 to produce the foam 70. The foamed extrusion 70 is guided by the rollers 30 while it cools. Optionally, for metals, the induction heater 34 can be used to re-melt the surface 74 of the foamed extrusion 70. Re-melting increases the structural strength of the foam 70. Otherwise it would be necessary to apply thin sheets of material (aluminum, for example) to the surface 74 in order to provide sufficient support in bending modes. The foamed material 70 can then be cut into desired lengths by the cutter 38. The ram 18, induction motor 46 and heater 34 can be powered by solar panels and/or batteries.

This invention continuously produces foamed metal and glass structural elements in orbit. The material 62 is fed into a furnace 14 which is heated preferably using solar energy. A ram 18 pushes molten material 62 through a die 22 where gas is injected into the melt 62 producing a foam 70. The surface 74 of the foam extrusion 70 can then be remelted if necessary and cut into desired lengths.

Thus, rather than launching solid beams for construction, using this invention, a small amount of metal and glass can be launched and then used to produce structural elements. For example, if one wanted to produce 1500 meters of 3 inch diameter beams then using aluminum foam of a relative density of 0.02 would only require approximately 87 pounds of aluminum. One version of this invention requires only sunlight to heat the furnace.

The following reference numerals are used on FIGS. 1 through . . . :

- 10 apparatus for carrying out the process of this invention
- 14 cylindrical furnace
- 18 ram
- 22 extrusion die
- 26 through channel
- 30 pull roller
- 34 induction heating coil
- 38 cutter
- 42 long axis of apparatus
- 46 induction motor
- 50 outside of furnace
- 54 Fresnel lens
- 58 iris
- 62 molten material
- 66 perimeter of extrusion die
- 70 foam extrusion
- 74 surface of extruded foam Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A process for producing foamed material in space comprising the steps of:
   a) rotating said material to simulate the force of gravity;
   b) heating said rotating material until it is molten;
   c) extruding said rotating, molten material;
   d) injecting gas into said extruded, rotating, molten material to produce molten foamed material; and
   e) allowing said molten foamed material to cool to below melting temperature to produce said foamed material.

2. A process as claimed in claim 1 further comprising the steps of melting the surface of said foamed material to above melting temperature and allowing said surface to cool to below melting temperature.

3. A process as claimed in claim 1 further comprising the step of cutting said foamed material to predetermined length.

4. A process as claimed in claim 1 in which said material is a metal.

5. A process as claimed in claim 1 in which said material is a glass.

6. A process as claimed in claim 1 in which heating is accomplished by concentrating solar energy on said material.

7. An apparatus for producing foamed material in space comprising:
   a) a furnace which rotates to simulate the force of gravity and heats said material until it is molten; said furnace having an inlet and an outlet; said outlet being located at the center of rotation of said furnace;
   b) an extrusion die adjacent said outlet; said extrusion die including a gas injector for injecting gas into said molten material; and
   c) a ram at the rear of said furnace for extruding said molten material through said extrusion die.

8. An apparatus as claimed in claim 7 further comprising a pull roller adjacent said extrusion die.

9. An apparatus as claimed in claim 7 further comprising a cutter at a distance from said furnace.

10. An apparatus as claimed in claim 7 in which said material is a metal.

11. An apparatus as claimed in claim 7 in which said material is a glass.

12. An apparatus as claimed in claim 7 further comprising a solar heater for said furnace.

13. An apparatus as claimed in claim 12 in which said solar heater includes a Fresnel lens.

14. An apparatus as claimed in claim 7 further comprising an electric heater for said furnace.

15. An apparatus as claimed in claim 7 further comprising an induction motor for feeding said material into said furnace.

* * * * *